United States Patent
Zhang

(10) Patent No.: US 11,522,792 B2
(45) Date of Patent: Dec. 6, 2022

(54) METHOD FOR DISCOVERING FORWARDING PATH AND RELATED DEVICE THEREOF

(71) Applicant: HUAWEI TECHNOLOGIES CO., LTD., Guangdong (CN)

(72) Inventor: Yongkang Zhang, Nanjing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 88 days.

(21) Appl. No.: 17/067,360

(22) Filed: Oct. 9, 2020

(65) Prior Publication Data
US 2021/0029023 A1 Jan. 28, 2021

Related U.S. Application Data

(63) Continuation of application No. PCT/CN2019/082345, filed on Apr. 12, 2019.

(30) Foreign Application Priority Data

Apr. 13, 2018 (CN) .......................... 201810337608.1

(51) Int. Cl.
H04L 45/00 (2022.01)
H04L 45/74 (2022.01)

(52) U.S. Cl.
CPC ............. *H04L 45/26* (2013.01); *H04L 45/74* (2013.01)

(58) Field of Classification Search
CPC combination set(s) only.
See application file for complete search history.

(56) References Cited

U.S. PATENT DOCUMENTS 9,178,811 B2 11/2015 Li
9,391,959 B2* 7/2016 Bjarnason ............... H04L 63/04
(Continued)

FOREIGN PATENT DOCUMENTS

CN 102957573 A 3/2013
CN 103415056 A 11/2013
(Continued)

OTHER PUBLICATIONS

M. Behringer, Ed. et al, "An Autonomic Control Plane (ACP) draft-ietf-anima-autonomic-control-plane-12", ANIMA WG Internet-Draft, Intended status: Standards Track, Oct. 12, 2017, total 106 pages.
(Continued)

*Primary Examiner* — Xavier S Wong
(74) *Attorney, Agent, or Firm* — Womble Bond Dickinson (US) LLP

(57) ABSTRACT

Embodiments of this application disclose a method for discovering a forwarding path and a related device thereof, to discover a forwarding path. The method includes: receiving, by a first device, a packet that is sent by a second device and that is used to discover a forwarding path; searching, by the first device based on a first forwarding entry of a data plane, for forwarding information used to forward the packet; and sending, by the first device, path information to the second device based on a second forwarding entry of an autonomic control plane virtual routing and forwarding (ACP VRF) instance, where the first forwarding entry and the second forwarding entry are isolated from each other. In the embodiments, the first forwarding entry and the second forwarding entry are isolated from each other, and returning of the path information is not affected by a data plane fault.

20 Claims, 6 Drawing Sheets

(56) References Cited

U.S. PATENT DOCUMENTS

| | | | |
|---|---|---|---|
| 2004/0103210 A1 | 5/2004 | Fujii et al. | |
| 2014/0010072 A1* | 1/2014 | Gandhi | H04L 47/825 370/392 |
| 2019/0273727 A1* | 9/2019 | Eckert | H04L 63/1466 |
| 2021/0014158 A1* | 1/2021 | Zhang | H04L 41/042 |

FOREIGN PATENT DOCUMENTS

| | | |
|---|---|---|
| CN | 103491006 A | 1/2014 |
| CN | 105634776 A | 6/2016 |
| CN | 110324165 A | 10/2019 |
| WO | 2019196914 A1 | 10/2019 |

OTHER PUBLICATIONS

M. Behringer et al, "Autonomic Networking: Definitions and Design Goals", Internet Research Task Force (IRTF), RFC 7575, Jun. 2015, total 16 pages.

T. Eckert, Ed. et al, "An Autonomic Control Plane (ACP) draft-ietf-anima-autonomic-control-plane-13", ANIMA WG Internet-Draft, Dec. 17, 2017, total 109 pages.

M. Pritikin et al, "Bootstrapping Remote Secure Key Infrastructures (BRSKI) draft-ietf-anima-bootstrapping-keyinfra-09", ANIMA WG Internet-Draft, Oct. 30, 2017, total 69 pages.

C. Bormann et al, "A Generic Autonomic Signaling Protocol (GRASP)draft-ietf-anima-grasp-15", Network Working Group Internet-Draft, Jul. 7, 2017, total 81 pages.

M. Behringer, Ed. et al, "A Reference Model for Autonomic Networking draft-ietf-anima-reference-model-05", ANIMA Internet-Draft, Oct. 19, 2017, total 29 pages.

K. Watsen et al, "Voucher Profile for Bootstrapping Protocols draft-ietf-anima-voucher-06", ANIMA Working Group Internet-Draft, Oct. 25, 2017, total 19 pages.

S. Jiang et al, "General Gap Analysis for Autonomic Networking", Internet Research Task Force (IRTF), RFC7576, Jun. 2015, total 17 pages.

J.O. Kephart et al, "The vision of autonomic computing", Publisher: IEEE, Published in: Computer (vol. 36, Issue: 1, Jan. 2003), pp. 41-50, total 10 pages.

* cited by examiner

| Device 1 | | Device 2 | | Device 3 | | Device 4 | |
|---|---|---|---|---|---|---|---|
| ACP ULA | Management IP address of a data plane | ACP ULA | Management IP address of a data plane | ACP ULA | Management IP address of a data plane | ACP ULA | Management IP address of a data plane |
| FDA3:79A6:F6EE:1 | 10:10 | FDA3:79A6:F6EE:2 | 20:20 | FDA3:79A6:F6EE:3 | 30:30 | FDA3:79A6:F6EE:4 | 40:40 |

FIG. 2

METHOD FOR DISCOVERING FORWARDING PATH AND RELATED DEVICE THEREOF

CROSS-REFERENCE TO RELATED APPLICATIONS

This application is a continuation of International Application No. PCT/CN2019/082345, filed on Apr. 12, 2019 which claims priority to Chinese Patent Application No. 201810337608.1, filed on Apr. 13, 2018. The disclosures of the aforementioned applications are hereby incorporated by reference in their entireties.

TECHNICAL FIELD

This application relates to the communications field, and in particular, to a method for discovering a forwarding path and a related device thereof.

BACKGROUND

With development of a network internet protocol (IP), higher requirements are put forward to simplify network operation and maintenance. How to further simplify the operation and maintenance has become an important issue at a current stage.

In the prior art, in order to discover a forwarding path, an initiating node carries a real service packet. A corresponding policy is directly searched for based on the real service packet, a next hop is searched for in a forwarding information base (FIB), path information is added to the packet, and then the packet to which the path information is added is forwarded to the next hop. In the next hop, similarly, a next hop is searched for in the FIB based on the policy, path information is added to the packet, the packet is forwarded to a further next hop if there is the further next hop after encapsulation, path information is encapsulated at the next hop until the packet reaches a detection terminal, and then the packet that carries all the path information is returned.

In the prior art, the path information is carried through hop-by-hop accumulation, and a detection packet is returned to the initiating node only at a detection end point. If the path is interrupted, the detection packet cannot reach the detection end point, and the (or some of the) path information cannot be collected, and a faulty node cannot be directly located.

SUMMARY

Embodiments of this application provide a method for discovering a forwarding path and a related device thereof, to discover a forwarding path.

A first aspect of the embodiments of this application provides a method for discovering a forwarding path, including: receiving, by a first device, a packet that is sent by a second device and that is used to discover a forwarding path; searching, by the first device based on a first forwarding entry of a data plane, for forwarding information used to forward the packet; and sending, by the first device, path information to the second device based on a second forwarding entry of an autonomic control plane virtual routing and forwarding (ACP VRF) instance, where the first forwarding entry and the second forwarding entry are isolated from each other. In this embodiment, the first forwarding entry and the second forwarding entry are isolated from each other, and returning of the path information is not affected by a fault of the first forwarding entry. When the first forwarding entry is faulty, the forwarding path can also be found.

In one embodiment of the first aspect of the embodiments of this application, the path information includes an IP address of the first device. In one embodiment, the path information includes the IP address of the first device, so that the second device can obtain path information that includes the first device.

In one embodiment of the first aspect of the embodiments of this application, the path information includes an identifier of a port used by the first device to receive the packet and an identifier of a port that is determined by the first device and that is used to forward the packet. In one embodiment, the path information may further include the identifier of the port used by the first device to receive the packet and the identifier of the port that is determined by the first device and that is used to forward the packet, so that this embodiment is more complete.

In one embodiment of the first aspect of the embodiments of this application, the path information includes information used to indicate that the path is interrupted. In this solution, the path information includes the information used to indicate that the path is interrupted, so that when receiving the path information, the second device can obtain a cause of the path interruption.

In one embodiment of the first aspect of the embodiments of this application, the path information includes an IP address of the first device and an identifier of a port used by the first device to receive the packet. In this solution, the path information further includes the IP address of the first device and the identifier of the port used by the first device to receive the packet, so that this embodiment is more complete and implementable.

In one embodiment of the first aspect of the embodiments of this application, the information used to indicate that the path is interrupted indicates a forwarding information base that causes a failure in searching for the forwarding information. In this solution, the information used to indicate that the path is interrupted indicates a forwarding information base that causes a failure in searching for the forwarding information, so that a cause of the interruption is more specific, and a user can more conveniently find a location of the interruption.

In one embodiment of the first aspect of the embodiments of this application, the first forwarding entry is a public network forwarding entry. In this solution, the first forwarding entry may be the public network forwarding entry. A type of the first forwarding entry is described, so that the solution is more implementable.

In one embodiment of the first aspect of the embodiments of this application, the first forwarding entry is a forwarding entry of a first VRF instance, and the first VRF instance is not an ACP VRF instance. In this solution, the first forwarding entry may alternatively be another VRF instance other than the ACP VRF instance.

A second aspect of the embodiments of this application provides a device, where the device is a first device and includes: a receiving unit, configured to receive a packet that is sent by a second device and that is used to discover a forwarding path; a searching unit, configured to search, based on a first forwarding entry of a data plane, for forwarding information used to forward the packet; and a sending unit, configured to send path information to the second device based on a second forwarding entry of an autonomic control plane virtual routing and forwarding ACP VRF instance, where the first forwarding entry and the second forwarding entry are isolated from each other. In this embodiment, the first forwarding entry and the second forwarding entry are isolated from each other, and returning of the path information is not affected by a fault of the first forwarding entry. When the first forwarding entry is faulty, the forwarding path can also be found.

In one embodiment of the second aspect of the embodiments of this application, the path information includes an IP address of the first device. In one embodiment, the path information includes the IP address of the first device, so that the second device can obtain path information that includes the first device.

In one embodiment of the second aspect of the embodiments of this application, the path information includes an identifier of a port used by the first device to receive the packet and an identifier of a port that is determined by the first device and that is used to forward the packet. In one embodiment, the path information may further include the identifier of the port used by the first device to receive the packet and the identifier of the port that is determined by the first device and that is used to forward the packet, so that this embodiment is more complete.

In one embodiment of the second aspect of the embodiments of this application, the path information includes information used to indicate that the path is interrupted. In this solution, the path information includes the information used to indicate that the path is interrupted, so that when receiving the path information, the second device can obtain a cause of the path interruption.

In one embodiment of the second aspect of the embodiments of this application, the path information includes an IP address of the first device and an identifier of a port used by the first device to receive the packet. In this solution, the path information further includes the IP address of the first device and the identifier of the port used by the first device to receive the packet, so that this embodiment is more complete and implementable.

In one embodiment of the second aspect of the embodiments of this application, the information used to indicate that the path is interrupted indicates a forwarding information base that causes a failure in searching for the forwarding information. In this solution, the information used to indicate that the path is interrupted indicates a forwarding information base that causes a failure in searching for the forwarding information, so that a cause of the interruption is more specific, and a user can more conveniently find a location of the interruption.

In one embodiment of the second aspect of the embodiments of this application, the first forwarding entry is a public network forwarding entry. In this solution, the first forwarding entry may be the public network forwarding entry. A type of the first forwarding entry is described, so that the solution is more implementable.

In one embodiment of the second aspect of the embodiments of this application, the first forwarding entry is a forwarding entry of a first VRF instance, and the first VRF instance is not an ACP VRF instance. In this solution, the first forwarding entry may alternatively be another VRF instance other than the ACP VRF instance.

A third aspect of the embodiments of this application provides a device, where the device is a first device, and the first device includes a processor and a memory, and the processor is configured to perform the following operations by invoking an operation instruction stored in the memory: receiving a packet that is sent by a second device and that is used to discover a forwarding path; searching, based on a first forwarding entry of a data plane, for forwarding information used to forward the packet; and sending path information to the second device based on a second forwarding entry of an autonomic control plane virtual routing and forwarding ACP VRF instance, where the first forwarding entry and the second forwarding entry are isolated from each other. In this embodiment, the first forwarding entry and the second forwarding entry are isolated from each other, and returning of the path information is not affected by a fault of the first forwarding entry. When the first forwarding entry is faulty, the forwarding path can also be found.

In one embodiment of the third aspect of the embodiments of this application, the path information includes an IP address of the first device. In one embodiment, the path information includes the IP address of the first device, so that the second device can obtain path information that includes the first device.

In one embodiment of the third aspect of the embodiments of this application, the path information includes an identifier of a port used by the first device to receive the packet and an identifier of a port that is determined by the first device and that is used to forward the packet. In one embodiment, the path information may further include the identifier of the port used by the first device to receive the packet and the identifier of the port that is determined by the first device and that is used to forward the packet, so that this embodiment is more complete.

In one embodiment of the third aspect of the embodiments of this application, the path information includes information used to indicate that the path is interrupted. In this solution, the path information includes the information used to indicate that the path is interrupted, so that when receiving the path information, the second device can obtain a cause of the path interruption.

In one embodiment of the third aspect of the embodiments of this application, the path information includes an IP address of the first device and an identifier of a port used by the first device to receive the packet. In this solution, the path information further includes the IP address of the first device and the identifier of the port used by the first device to receive the packet, so that this embodiment is more complete and implementable.

In one embodiment of the third aspect of the embodiments of this application, the information used to indicate that the path is interrupted indicates a forwarding information base that causes a failure in searching for the forwarding information. In this solution, the information used to indicate that the path is interrupted indicates a forwarding information base that causes a failure in searching for the forwarding information, so that a cause of the interruption is more specific, and a user can more conveniently find a location of the interruption.

In one embodiment of the third aspect of the embodiments of this application, the first forwarding entry is a public network forwarding entry. In this solution, the first forwarding entry may be the public network forwarding entry. A type of the first forwarding entry is described, so that the solution is more implementable.

In one embodiment of the third aspect of the embodiments of this application, the first forwarding entry is a forwarding entry of a first VRF instance, and the first VRF instance is not an ACP VRF instance. In this solution, the first forwarding entry may alternatively be another VRF instance other than the ACP VRF instance.

According to another aspect of this application, a computer-readable storage medium is provided. The computer-readable storage medium stores an instruction. When the instruction is run on a computer, the computer is enabled to perform the methods according to the foregoing aspects.

According to still another aspect of this application, a computer program product including an instruction is provided, and when the instruction is run on a computer, the computer is enabled to perform the methods according to the foregoing aspects.

It can be learned from the foregoing technical solutions that the embodiments of this application have the following advantages: A first device receives a packet that is sent by a second device and that is used to discover a forwarding path; the first device searches, based on a first forwarding entry of a data plane, for forwarding information used to forward the packet; the first device sends path information to the second device based on a second forwarding entry of an autonomic control plane virtual routing and forwarding ACP VRF instance, and the first forwarding entry and the second forwarding entry are isolated from each other. In this embodiment, the first forwarding entry and the second forwarding entry are isolated from each other, and returning of the path information is not affected by a fault of the first forwarding entry.

BRIEF DESCRIPTION OF DRAWINGS

FIG. 2 is a networking description of a device in a method for discovering a forwarding path according to an embodiment of this application;

DESCRIPTION OF EMBODIMENTS

Embodiments of this application provide a method for discovering a forwarding path and a related device thereof, to discover a forwarding path.

In the embodiments of this application and the accompanying drawings corresponding to the embodiments, the terms "first", "second", "third", "fourth", and so on (if existent) are intended to distinguish between similar objects but do not necessarily indicate a particular order or sequence. It should be understood that the data termed in such a way are interchangeable in proper circumstances so that the embodiments of the application described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

Figure 1:
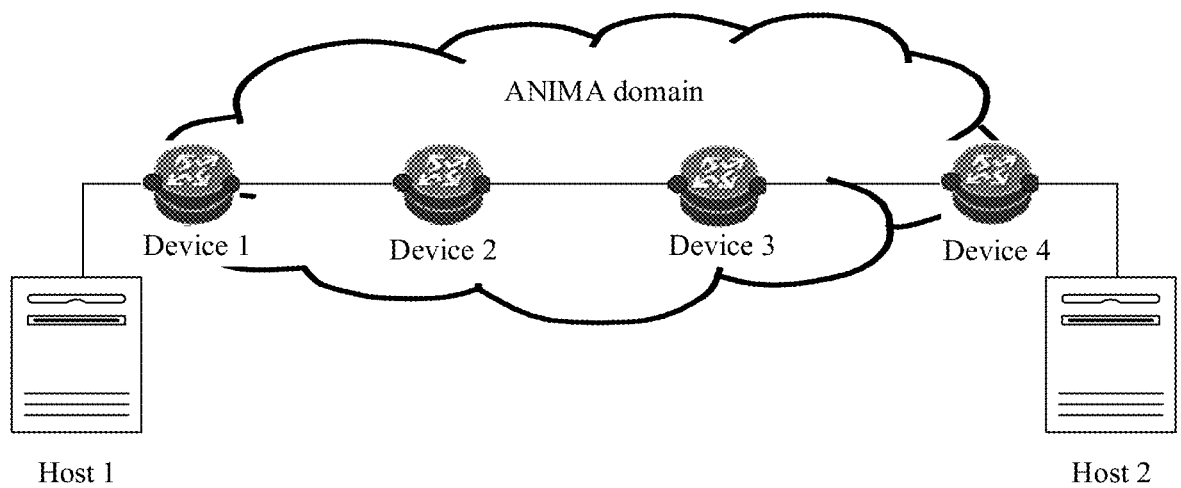
FIG. 1 is a schematic diagram of a networking scenario of a method for discovering a forwarding path according to an embodiment of this application.

This application supports discovery of forwarding path information of a device in an autonomic networking integrated model and approach (ANIMA) domain. As shown in FIG. 1, a device 1 to a device 4 in FIG. 1 successfully join the ANIMA domain, and a host 1 and a host 2 are devices outside the ANIMA domain. In this application, a forwarding path of the device in the ANIMA domain can be discovered. FIG. 2 illustrates the device in FIG. 1, and an ACP ULA in FIG. 2 is a dedicated IP address of the device in the ANIMA domain, in other words, the IP address is a unique IP address of the device in the ANIMA domain, and the ACP ULA is an IPv6 ULA. A management IP address of a data plane is an IP address used by the device to forward a service packet. In other words, the management IP address of the data plane is an IP address of VRF (including a public network) of other planes except the ACP VRF.

The ANIMA is currently a working group of an internet engineering task force (IETF). ANIMA-related request for comments (RFC)/drafts are as follows:

1: RFC7575 autonomic networking: definitions and design goals: The RFC defines a main concept of a self-organizing network and a design objective of the ANIMA, and preliminarily defines a reference model of the ANIMA.

2: RFC7576 general gap analysis for autonomic networking: The RFC analyzes self-organizing capabilities of existing standard protocols in various fields to provide a suggestion for subsequent standardization work of the ANIMA.

After a device is added to the ANIMA domain, a running plane can be divided into an autonomic control plane (ACP VRF) and a data plane. The ACP VRF provides a virtual out of band channel (VOOB) for the device to implement network management. The data plane refers to the VRF (including the public network) of other planes except the ACP VRF, in other words, a common service plane.

The ACP VRF has the following advantages.

High isolation: The ACP VRF has an independent forwarding plane, and connectivity does not depend on the data plane. The connectivity of the ACP VRF is not affected regardless of whether the data plane has a route and which forwarding model (IP/MPLS or IPv4/IPv6) is used.

High stability: As long as an ACP node is located in the ANIMA domain, the ACP VRF always exists and is not affected by configuration and a running status of the data plane.

Fully connected: Any two devices in the domain can communicate with each other through routing protocol for LLN, RPL.

Uniform signaling protocol with good extensibility: As a uniform information protocol, a generic autonomic signaling protocol (GRASP) has abundant basic communication capabilities, can be unlimitedly extended, and can carry data of any form.

High security: Secure bootstrapping and an ACP secure tunnel are used to ensure high security of communication between devices.

Seamless integration with the data plane: Within a same device, the ACP VRF/data plane can securely access all data of each other.

Figure 3:
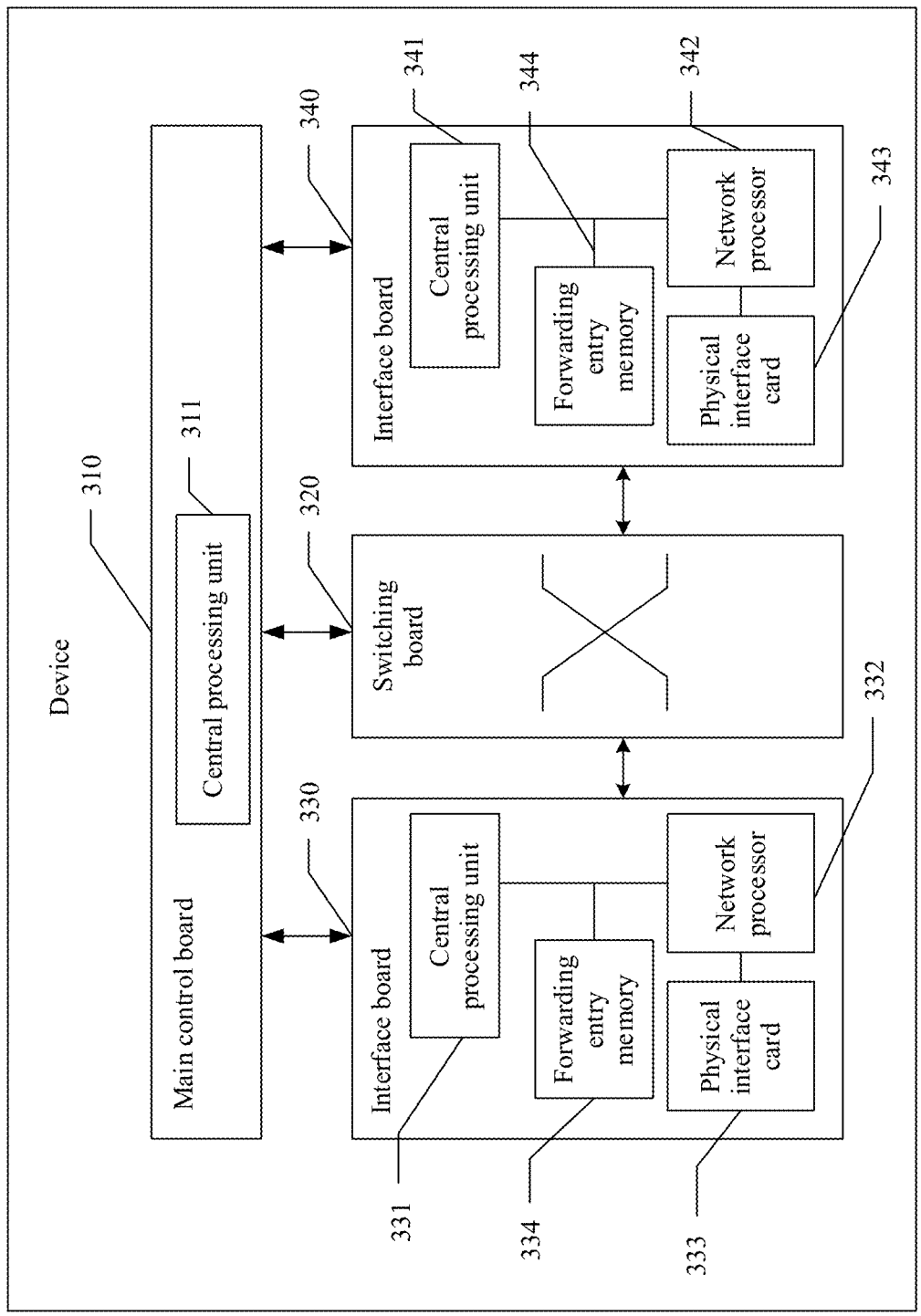
FIG. 3 is a schematic diagram of a network architecture of a device according to an embodiment of this application.

A network framework diagram of a device in this application is shown in FIG. 3, and mainly includes a main control board 310 and a central processing unit 311 on the main control board 310; an interface board 330, a central processing unit 331, a forwarding entry memory 334, a physical interface card 333, and a network processor 332 that are on the interface board 330; switching board 320; an interface board 340, a central processing unit 341, a forwarding entry memory 344, a physical interface card 343, and a network processor 342 that are on the interface board 340. The central processing unit 311 may be configured to process all data on the device, the central processing unit 331 is mainly configured to process data on the interface board 330, and is configured to reduce a workload of the central processing unit 311, and the central processing unit 341 is mainly configured to process data on the interface board 340, and may also reduce a workload of the central processing unit 311.

It should be noted that a service flow type of a device in this embodiment of this application may be an IP address, or may be another type. A specific service flow type is not limited herein. In this embodiment of this application, an example in which the IP address is the service flow type is used to describe in detail a method for discovering a forwarding path in this embodiment of this application.

Figure 4:
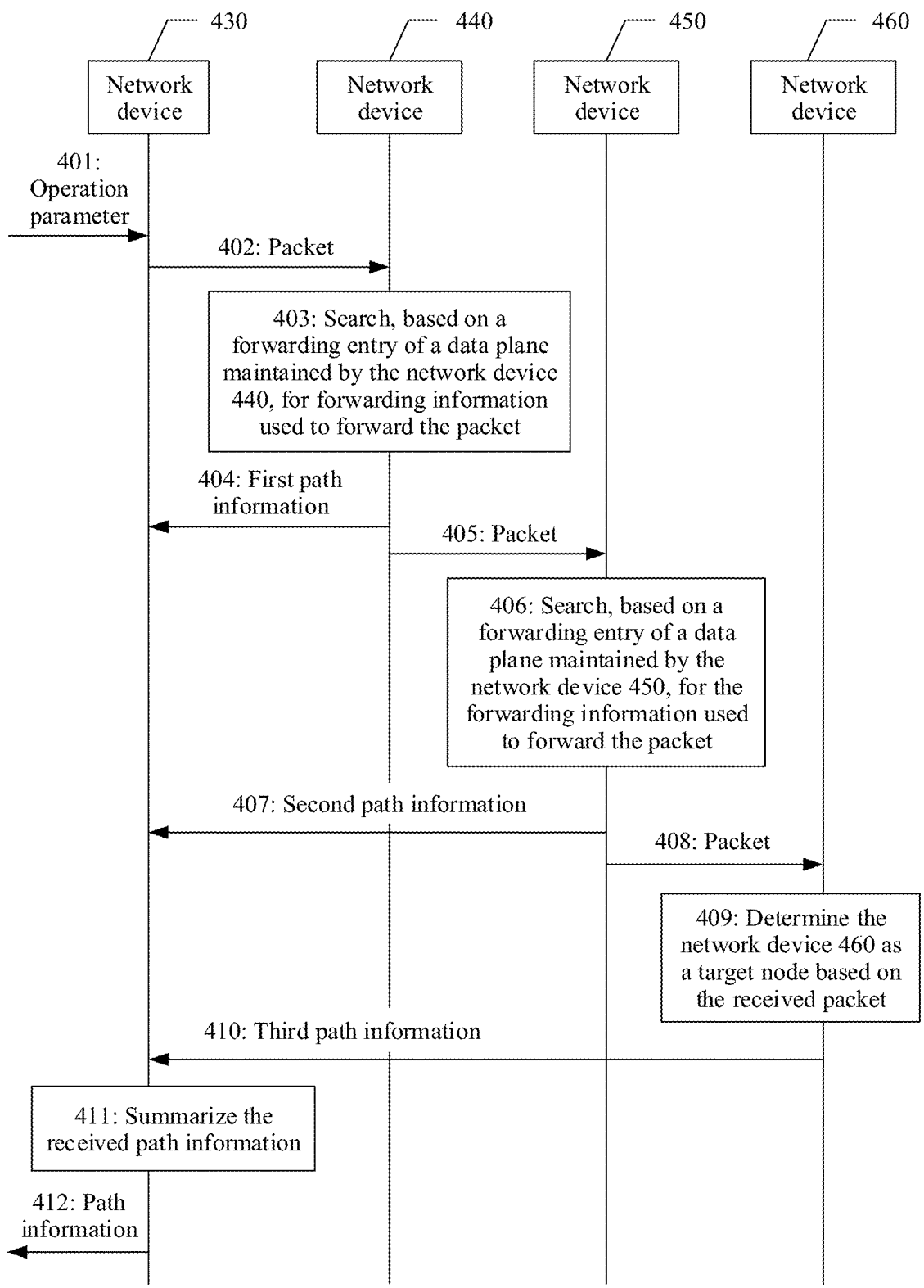
FIG. 4 is a schematic flowchart of a method for discovering a forwarding path according to an embodiment of this application.

Referring to FIG. 4, an embodiment of a method for discovering a forwarding path according to an embodiment of this application includes the following operations.

401: A network device 430 obtains an operation parameter used to discover a forwarding path.

In this embodiment, an administrator logs in to the network device 430 through an operation and maintenance (OM) interface of the network device 430, to discover forwarding path information of a service flow in an ANIMA domain on the network device 430. First, the administrator or another management device inputs the operation parameter to the network device 430 through the OM interface, and the operation parameter includes an identifier of the service flow. The identifier of the service flow may include an IP address of the network device 430, an IP address of a target node, and an operation type. The network device may be an ingress node of the ANIMA domain, and the IP address of the network device may be used as a source IP address, which is referred to as SrcIP for short. An IP address of a destination device may be referred to as a destination IP address (DestIP) for short. The operation type may be discovery of the forwarding path of the service flow.

It should be noted that the operation parameter may further include a simulated inbound interface, and the inbound interface is used to indicate that the network device 430 is a network device 430 in the ANIMA domain.

It should be noted that, various parameters may be set for the operation parameter based on an actual requirement, for example, an operation procedure control parameter (e.g., used to control a quantity of sent packets, a packet sending interval, operation timeout duration, and control some encapsulation parameters of the packet, and the like), and feedback output control parameter (e.g., used to output a detailed degree control parameter of information, and an output control parameter of information carried in an information packet, and whether to record error information/logging information, and the like). A specific parameter is not limited herein.

It should be noted that in this application, a hop-by-hop sending-up mechanism may be further separately set based on different forwarding models, for example, time to live (TTL)/hop-limit or router alert of an IPv4/IPv6 packet, or label alert or control word of a multi-protocol label switching (MPLS) packet.

402: The network device 430 sends, to a network device 440 based on a forwarding entry of a data plane maintained by the network device 430, a packet used to discover the forwarding path.

In this embodiment, the network device 430 queries, based on a DestIP in the operation parameter, an outbound interface of the service flow on the network device 430, an IP address of a next-hop device, and the like on the data plane of the network device 430. The data plane may refer to a VPN or a public network implemented based on another type of VRF that is different from ACP VRF. Therefore, the forwarding entry of the data plane may be a forwarding entry in the VPN implemented based on the another type of VRF, or may be a forwarding entry in the public network. The forwarding entry in the VPN implemented based on the another type of VRF is a forwarding entry in a VRF instance of the another type of VRF.

Figure 5:
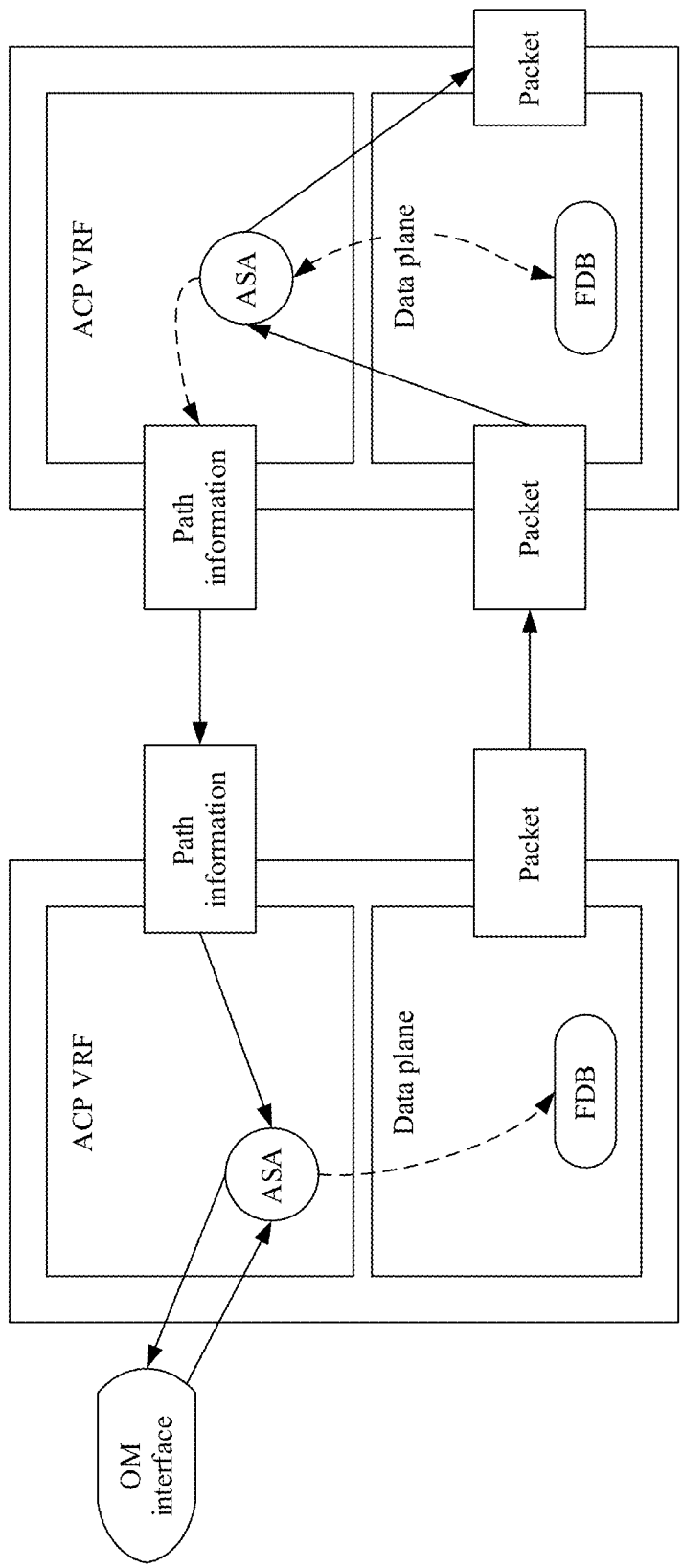
FIG. 5 is a schematic diagram of an application scenario of a method for discovering a forwarding path according to an embodiment of this application.

FIG. 5 is a schematic diagram of an application scenario according to an embodiment of this application. After the network device 430 obtains an operation parameter, an autonomous service agent (ASA) in the network device 430 queries a forwarding database (FDB) of the network device 430 on the data plane based on the DestIP in the operation parameter, to obtain the outbound interface of the service flow and the IP address of the next-hop device. Then, the network device 430 sends the packet to the network device 440 based on the obtained outbound interface of the service flow and the IP address of the next-hop device, and the packet is obtained by the network device 430 by encapsulating the operation parameter. The network device 440 is the next-hop device of the network device 430. A forwarding model of the packet for discovering the forwarding path in the data plane may be IP-based or MPLS-based. When the forwarding model is IP-based, the forwarding model may be referred to as an IP forwarding model. In this case, the FDB may refer to an FIB. When the forwarding model is MPLS-based, the forwarding model may be referred to as an MPLS forwarding model. In this case, the FDB may refer to a label forwarding entry, for example, a forwarding entry such as an NLHFE/ILM defined in RFC3031. When the IP forwarding model is used, the packet can be forwarded on the public network or the VPN. A segment-routing (SR) IPv6 technology is a sub-type of the IP forwarding model. The IP forwarding model can implement L2VPN/L3VPN, for example, EVPN over VXLAN. The MPLS forwarding model performs forwarding based on an MPLS label and can implement a plurality of MPLS L2VPNs and L3VPNs, including traditional BGP/MPLS-based VPNs and EVPN/MPLS-based VPNs.

It should be noted that, if a plurality of downstream paths such as equal-cost multi-path routing (ECMP) exist, the packet may be forwarded to each downstream path, or a downstream path is selected according to a hash algorithm, and the packet is sent to the selected downstream path.

403: The network device 440 searches, based on a forwarding entry of a data plane maintained by the network device 440, for forwarding information used to forward the packet.

In this embodiment, as shown in FIG. 5, after the network device 440 receives the packet, because the hop-by-hop sending-up mechanism is set in the packet, the network device 440 sends the packet to an ASA in the network device for processing. After receiving the packet, the ASA decapsulates the packet to obtain operation parameter information in the packet, queries, based on a DestIP in the parameter information, a forwarding information base of the data plane maintained by the network device 440, to obtain the forwarding entry corresponding to the DestIP, and determines, from the forwarding entry corresponding to the DestIP, the forwarding information used to forward the packet. The forwarding information includes an outbound interface of the service flow on the network device 440, the IP address of the next-hop device, and the like. Because the ASA is a software module, when a structure of the network device 440 is shown in FIG. 3, the network device 440 needs to send a packet received from the physical interface card 333 to the central processing unit 311 in the main control board 310. The central processing unit 311 invokes the ASA module to perform the foregoing operations performed by the ASA, and the forwarding information base of the data plane may be stored in a memory in the main control board of the network device 440.

404: The network device 440 sends first path information to the network device 430 based on a forwarding entry of an ACP VRF instance in the network device 440.

The network device 440 searches an RPL forwarding information base of the ACP VRF instance based on an ingress node in the packet, in other words, an ACP ULA of the network device 430, to obtain a forwarding entry corresponding to the ACP ULA, and determines, from the forwarding entry corresponding to the ACP ULA, forwarding information used to send the first path information to the network device 430, and the forwarding information may be referred to as reverse forwarding information. Then, the network device 440 sends the first path information to the network device 430 based on the reverse forwarding information. When the structure of the network device 440 is shown in FIG. 3, the central processing unit 311 in the main control board 310 queries the RPL forwarding information base of the ACP VRF instance based on the ACP ULA to obtain the forwarding entry corresponding to the ACP ULA, and determines the reverse forwarding information in the forwarding entry corresponding to the ACP ULA, and the forwarding information base of the ACP VRF instance may be stored in a memory of the main control board of the network device 440.

The network device 440 has respective forwarding information bases for the data plane and the ACP VRF logically or physically. Each forwarding information base may include a plurality of entries. The network device 440 may search the forwarding information base based on an address to find a forwarding entry corresponding to the address, and then find the forwarding information in the forwarding entry. When the network device 440 queries the forwarding information on the data plane, the network device 440 queries the forwarding information base of the data plane maintained by the network device 440, finds the forwarding entry that matches the destination IP address, and further determines the forwarding information. When the network device 440 queries the reverse forwarding information based on the ACP VRF, the network device 440 queries the forwarding information base of the ACP VRF instance in the network device 440, finds the forwarding entry that matches the destination IP address, and further determines the reverse forwarding information. The forwarding information base of the ACP VRF instance is learned by the routing protocol RPL. Forwarding entries in the forwarding information base include: (1) Direct route (a local host route generated by a loopback interface on which the ACP ULA is located); (2) Static route (the static route can be configured in the ACP VRF based on a specific implementation); (3) RPL dynamic route (an ACP ULA host route and a static route learned from other devices in a domain through the RPL)

The ACP VRF is based on the IP forwarding model, and the data plane can be based on either the IP forwarding model or the MPLS forwarding model. When the data plane uses the IP forwarding model, during implementation, the forwarding information base of the ACP VRF and the forwarding information base of the data plane can belong to a same physical forwarding information base. However, the forwarding information base of the ACP VRF and the forwarding information base of the data plane are logically isolated. When the data plane uses the MPLS forwarding model, the ACP VRF and the data plane use different forwarding information bases, and the forwarding information base of the ACP VRF and the forwarding information base of the data plane are physically (forwarding information base) isolated.

When the network device 440 finds the next-hop device and the outbound interface based on the DestIP of the packet received in the operation 402, the first path information includes: an IP address of the network device 440, an identifier (an ingress port) of a port used by the network device to receive the packet, and an identifier (an egress port) of a port that is determined by the network device 440 and that is used to forward the packet. In addition, the first path information may further include a next-hop IP address of the network device 440, namely, an IP address of a network device 450.

It should be noted that content of the first path information may correspond to the operation parameter in the packet. In other words, the network device 440 may return a corresponding message based on specific content of the operation parameter carried in the packet received in the operation 402. For example, if a maximum transmission unit (MTU) of the outbound interface of the device needs to be returned is set in the operation parameter, the first path information may further include an outbound interface MTU of the packet in the network device 440.

It should be noted that, if the ECMP exists in a next hop of the network device 440, the identifier of the port that is determined by the network device 440 and that is used to forward the packet and that is in the first path information may include an outbound interface obtained based on a hash result or all possible outbound interfaces.

When the network device 440 cannot find the next hop and the outbound interface based on the DestIP in the packet, the first path information includes information used to indicate that the path is interrupted, the IP address of the network device 440, and the identifier of the port used by the network device 440 to receive the packet. When the network device 430 receives the first path information, the network device starts to perform summary computation on the path, and identifies, based on the first path information, a node on which interruption occurs and a reason of the interruption. The cause of the interruption may include: a forwarding entry of the next hop does not exist, learning of an ARP/ND entry fails, an internal implementation error (for example, a memory allocation failure during processing, a code running error, and the like), and the like.

It should be noted that a specific degree of the information used to indicate that the path is interrupted corresponds to a requirement of the operation parameter in the packet. The information used to indicate that the path is interrupted may indicate a cause of a failure in searching for the forwarding information. For example, the information used to indicate that the path is interrupted may indicate that ARP parsing for a next-hop address fails.

As shown in FIG. 5, the ASA in the network device 440 sets the ACP ULA of the ingress node to the destination IP address of the packet to be sent to the network device 430, queries the forwarding information in the ACP VRF by using the ACP ULA, and sends, to the network device 430 by using the forwarding information, the packet that includes the first path information.

405: The network device 440 sends, to the network device 450 based on the forwarding entry of the data plane maintained by the network device 440, the packet used to discover the forwarding path.

406: The network device 450 searches, based on a forwarding entry of a data plane maintained by the network device 450, for the forwarding information used to forward the packet.

The forwarding information in the operation 406 includes an outbound interface of the service flow on the network device 450, the IP address of the next-hop device, and the like.

407: The network device 450 sends second path information to the network device 430 based on a forwarding entry of an ACP VRF instance in the network device 450.

When the network device 450 finds the next-hop device and the outbound interface based on the DestIP of the packet received in the operation 405, the second path information includes: an IP address of the network device 450, an identifier (an ingress port) of a port used by the network device to receive the packet, and an identifier (an egress port) of a port that is determined by the network device 450 and that is used to forward the packet. In addition, the first path information may further include a next-hop IP address of the network device 450, namely, an IP address of a network device 460.

When the network device 450 cannot find the next hop and the outbound interface based on the DestIP in the packet, the second path information includes information used to indicate that the path is interrupted, the IP address of the network device 450, and the identifier of the port used by the network device 450 to receive the packet. When the network device 430 receives the second path information, the network device starts to perform the summary computation on the path, and identifies, based on the second path information, a node on which interruption occurs and a reason of the interruption.

It should be noted that the operation 405 to the operation 407 are similar to the operation 402 to the operation 404. Details are not described herein again.

408: The network device 450 sends, to the network device 460 based on the forwarding entry of the data plane maintained by the network device 450, the packet used to discover the forwarding path.

409: The network device 460 determines the network device 460 as a target node based on the received packet.

In this embodiment, as shown in FIG. 5, after the network device 460 receives the packet, because the hop-by-hop sending-up mechanism is set in the packet, the network device 460 sends the packet to an ASA in the network device for processing. After receiving the packet, the ASA decapsulates the packet to obtain operation parameter information in the packet, and finds that a DestIP in the parameter information corresponds to the IP address of the network device 460. In this case, the network device 460 determines the network device 460 as the target node.

410: The network device 460 sends third path information to the network device 430 based on a forwarding entry of an ACP VRF instance in the network device 460.

In this embodiment, the operation 410 is similar to the operation 404. Details are not described herein again.

When the network device 460 determines that the network device 460 is the target node, the network device 460 determines that there is no need to send the packet to a next hop of the network device 460. In this case, the third path information includes the IP address of the network device 460, an identifier (an ingress port) of a port used by the network device to receive the packet, and information that indicates that the network device 460 is the target node.

The network device 460 may alternatively be an edge device in the ANIMA domain. When the network device 460 determines that the network device 460 is the target node, the network device 460 determines that there is no need to send the packet to a next hop of the network device 460. In this case, the third path information includes the IP address of the network device 460, the identifier (the ingress port) of the port used by the network device to receive the packet, and information that indicates that the network device 460 is the edge device. When the network device 430 receives the third path information, the network device starts to perform the summary computation on the path.

Alternatively, the network device 460 may not be the target node or the edge device, but may be a forwarding device in the ANIMA domain. When the network device 460 finds the next-hop device and the outbound interface based on the DestIP of the packet received in the operation 408, the third path information includes: the IP address of the network device 460, the identifier (the ingress port) of the port used by the network device to receive the packet, and the identifier (egress port) of the port that is determined by the network device 460 and that is used to forward the packet. In addition, the first path information may further include a next-hop IP address of the network device 460. In this case, the network device 460 continues to send the packet to the next hop of the network device 460 until the packet is forwarded to a target device, the edge device, or a faulty device. When the network device 460 cannot find the next hop and the outbound interface based on the DestIP in the packet (in this case, the network device 460 is a faulty device), the third path information includes information used to indicate that the path is interrupted, the IP address of the network device 460, and the identifier of the port used by the network device 460 to receive the packet. When the network device 430 receives the third path information, the network device starts to perform the summary computation on the path, and identifies, based on the third path information, a node on which interruption occurs and a reason of the interruption.

411: The network device 430 summarizes received path information.

In this embodiment, when the network device 430 discovers, based on the received third path information, that the network device 460 is the target node, the network device 430 performs the summary computation on all received path information (the first path information, the second path information, and the third path information), to obtain complete path information.

When the network device 430 discovers, based on the received third path information, that the network device 460 is the edge device, the network device 430 also performs the summary computation on all the received path information, to obtain path information from the network device 430 to the edge device.

When the network device 430 discovers, based on the received third path information, that the network device 460 is the faulty device, the network device 430 also performs the summary computation on all the received path information to obtain path information from the network device 430 to the faulty device. In this case, the network device 430 obtains a cause of the path interruption based on the third path information.

412: The network device 430 sends the path information to an operation and maintenance interface.

In this embodiment, after the network device 430 performs the summary computation on the received path information, when the complete path information is obtained through the summary computation in the operation 411, in this case, the network device 430 sends the complete path information to the operation and maintenance interface, and presents the path information to the administrator.

When the path information from the network device 430 to the edge device is obtained through the summary computation in the operation 411, in this case, the path information from the network device 430 to the edge device is sent to the operation and maintenance interface, and the path information is presented to the administrator.

When the path information from the network device 430 to the faulty device is obtained through the summary computation in the operation 411, in this case, the path information from the network device 430 to the faulty device and the cause of the path interruption are sent to the operation and maintenance interface, and the path information and the cause of the path interruption are presented to the administrator.

In this embodiment, the packet simulates a service packet and is forwarded in the data plane in an out of band manner. A same forwarding and encapsulation parameter (such as a destination IP address) as that of the service packet is used. Path information (such as the inbound interface, and the outbound interface/next hop) and a network device are discovered in a hop by hop sending ACP VRF forwarding manner.

In this embodiment, after receiving the packet, a device should return the path information to the network device 430 regardless of whether there is a next hop (a path is terminated or interrupted).

The method for discovering a forwarding path in this embodiment has at least the following advantages.

1. Authenticity: The packet is forwarded to the next hop through the data plane, and the packet in this application has forwarding parameter encapsulation similar to that of the service packet, and has a highly fitted forwarding path.

2. Reliability: The ACP VRF instance is used to return the path information to the network device 430, which ensures that the path information can definitely be returned to the network device 430 and is not affected by a data plane fault.

3. Richness: The performed operations and the returned path information are implemented and obtained inside each hop device (instead of a network management system (NMS)), and all possible path information may be returned as required.

4. Extensive adaptability: This method is independent of forwarding models (such as IP/MPLS, IPv4/IPv6, and L2VPN/L3VPN) and applies to all possible forwarding models.

5. No impact on services: The service packet does not need to be modified, and a current service process is not affected.

6. Simplicity: In the present application, the complete path information can be collected, the faulty device (a path interruption point) can be found, and a fault cause can be found only by one click on the network device 430, which is independent of the NMS.

7. Security: This method is based on a security architecture of ANIMA ANI, which is highly secure.

In this embodiment of this application, the network device 440 receives the packet that is sent by the network device 430 and that is used to discover the forwarding path. The network device 440 searches, based on a first forwarding entry, for forwarding information used to forward the packet. The network device 440 sends the path information to the network device 430 based on a second forwarding entry, and the first forwarding entry and the second forwarding entry are isolated from each other. In this embodiment, the first forwarding entry and the second forwarding entry are isolated from each other, and returning of the path information is not affected by a fault of the data plane. When the data plane is faulty, the forwarding path can also be found.

Figure 6:
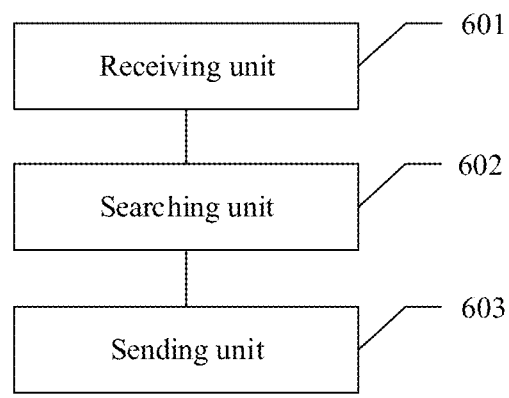
FIG. 6 is a schematic diagram of a structure of a device according to an embodiment of this application.

The foregoing describes the method for discovering a forwarding path in the embodiments of this application. The following describes a device in the embodiments of this application. Referring to FIG. 6, a device in the embodiments of this application includes a receiving unit 601, a searching unit 602, and a sending unit 603.

The receiving unit 601 is configured to receive a packet that is sent by another device and that is used to discover a forwarding path.

The another device is an upper-level device of the device, and an operation parameter is encapsulated in the packet. The operation parameter is input by an administrator or another management device to an ingress node through an OM interface. The ingress node may be the another device, and the operation parameter includes an identifier of a service flow. The identifier of the service flow may include an IP address of the ingress node, an IP address of a target node, and an operation type.

The searching unit 602 is configured to search, based on a first forwarding entry of a data plane, for forwarding information used to forward the packet.

The first forwarding entry is a public network forwarding entry, or the first forwarding entry is a forwarding entry of another VRF instance except an ACP VRF instance.

The forwarding information includes an outbound interface of the service flow on the device, an IP address of a next-hop device, and the like.

The sending unit 603 is configured to send path information to the another device based on a second forwarding entry of an autonomic control plane virtual routing and forwarding ACP VRF instance, and the first forwarding entry and the second forwarding entry are isolated from each other.

The path information includes: an IP address of the device, an identifier of a port used by the device to receive the packet, an identifier of a port that is determined by the device and that is used to forward the packet, and the like.

Alternatively, the path information includes: information used to indicate that the path is interrupted, the IP address of the device, and the identifier of the port used by the device to receive the packet, and the like. The information used to indicate that the path is interrupted indicates a forwarding information base that causes a failure in searching for the forwarding information.

In FIG. 6, the device in the embodiments of this application is described in detail from a perspective of a modular functional entity. The following describes the device in the embodiments of this application in detail from a perspective of hardware processing.

Figure 7:
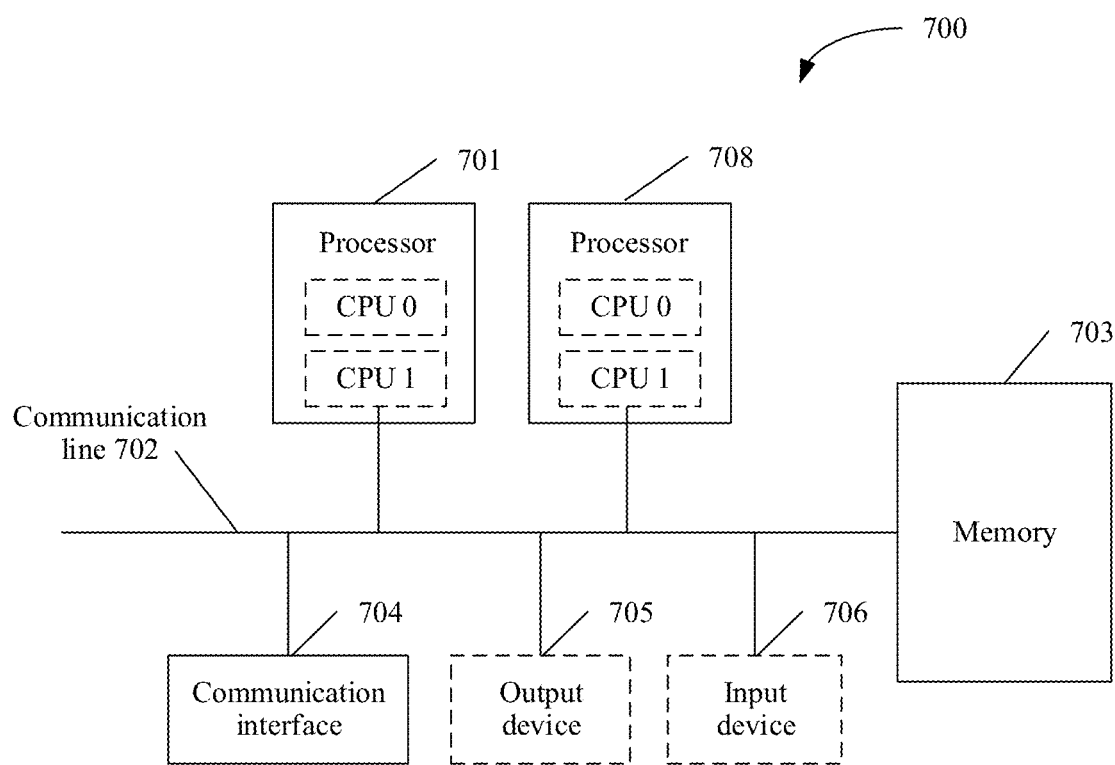
FIG. 7 is a schematic diagram of another structure of a device according to an embodiment of this application.

For example, the method for discovering a forwarding path in FIG. 4 may be implemented through a device in FIG. 7. FIG. 7 is a schematic diagram of a hardware structure of a device according to an embodiment of this application. The device may be the network device 430, the network device 440, the network device 450, or the network device 460 in the embodiment corresponding to FIG. 4. The device 700 includes at least one processor 701, a communication line 702, a non-transitory computer-readable memory 703, and at least one communication interface 704.

The processor 701 may be a general-purpose central processing unit (CPU), a microprocessor, an application-specific integrated circuit (ASIC), or one or more integrated circuits configured to control program execution of the solutions of this application.

The communication line 702 may include a path for transmitting information between the foregoing components.

The communication interface 704 that uses any apparatus such as a transceiver is configured to communicate with another device or a communications network, for example, Ethernet, a radio access network (RAN), or a wireless local area network (WLAN).

The memory 703 may be a read-only memory (ROM) or another type of static storage device capable of storing static information and an instruction, or a random access memory (RAM) or another type of dynamic storage device capable of storing information and an instruction; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blue-ray disc, or the like), a magnetic disk storage medium or another magnetic storage device, or any other medium capable of carrying or storing expected program code in a form of an instruction or a data structure and capable of being accessed by a computer. This is not limited thereto. The memory may exist independently and is connected to the processor with the communication line 702. The memory may be integrated with the processor. The processor 701 enables, based on to the computer-readable instruction stored in the memory 703, the device shown in FIG. 7 to perform some or all operations performed by the network device 440, the network device 450, or the network device 460.

During implementation, in an embodiment, the processor 701 may include one or more CPUs, for example, a CPU 0 and a CPU 1 in FIG. 7.

During implementation, in an embodiment, the device 700 may include a plurality of processors, for example, the processor 701 and a processor 708 in FIG. 7. Each of the processors may be a single-core (single-CPU) processor, or may be a multi-core (multi-CPU) processor. The processor herein may refer to one or more devices, circuits, and/or processing cores configured to process data (for example, a computer program instruction).

During implementation, in an embodiment, the device 700 may further include an output device 705 and an input device 706. The output device 705 communicates with the processor 701, and may display information in a plurality of manners. For example, the output device 705 may be a liquid crystal display (LCD), a light emitting diode (LED) display device, a cathode ray tube (CRT) display device, a projector, or the like. The input device 706 communicates with the processor 701, and may receive an input of a user in a plurality of manners.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for discovering a forwarding path comprising:
   receiving, by a first device, a packet sent by a second device and used to discover a forwarding path;
   searching, by the first device based on a first forwarding entry of a data plane, for forwarding information used to forward the packet; and
   sending, by the first device, path information to the second device based on a second forwarding entry of an autonomic control plane virtual routing and forwarding (ACP VRF) instance, wherein the first forwarding entry and the second forwarding entry are isolated from each other.

2. The method according to claim 1, wherein the path information comprises an IP address of the first device.

3. The method according to claim 1, wherein the path information comprises an identifier of a port used by the first device to receive the packet and an identifier of a port determined by the first device and used to forward the packet.

4. The method according to claim 1, wherein the path information comprises information used to indicate that the path is interrupted.

5. The method according to claim 4, wherein the path information comprises an IP address of the first device and an identifier of a port used by the first device to receive the packet.

6. The method according to claim 4, wherein the information used to indicate that the path is interrupted indicates a forwarding information base that causes a failure in searching for the forwarding information.

7. The method according to claim 1, wherein the first forwarding entry is a public network forwarding entry.

8. The method according to claim 1, wherein the first forwarding entry is a forwarding entry of a first VRF instance, and the first VRF instance is not an ACP VRF instance.

9. A first device comprising:
   a processor; and
   a memory storing computer-readable instructions, which when executed by the processor, cause the processor to be configured to:
   receive a packet sent by a second device used to discover a forwarding path;
   search, based on a first forwarding entry of a data plane, for forwarding information used to forward the packet; and
   send path information to the second device based on a second forwarding entry of an autonomic control plane virtual routing and forwarding (ACP VRF) instance, wherein the first forwarding entry and the second forwarding entry are isolated from each other.

10. The device according to claim 9, wherein the path information comprises an IP address of the first device.

11. The device according to claim 9, wherein the path information comprises an identifier of a port used by the first device to receive the packet and an identifier of a port determined by the first device and used to forward the packet.

12. The device according to claim 9, wherein the path information comprises information used to indicate that the path is interrupted.

13. The device according to claim 12, wherein the path information comprises an IP address of the first device and an identifier of a port used by the first device to receive the packet.

14. The device according to claim 12, wherein the information used to indicate that the path is interrupted indicates a forwarding information base that causes a failure in searching for the forwarding information.

15. The device according to claim 9, wherein the first forwarding entry is a public network forwarding entry.

16. The device according to claim 9, wherein the first forwarding entry is a forwarding entry of a first VRF instance, and the first VRF instance is not an ACP VRF instance.

17. A computer-readable storage medium, comprising instructions, which when executed by a processor, cause the processor to perform a method comprising:
   receiving a packet sent by a second device and used to discover a forwarding path;
   searching, based on a first forwarding entry of a data plane, for forwarding information used to forward the packet; and
   sending path information to the second device based on a second forwarding entry of an autonomic control plane virtual routing and forwarding (ACP VRF) instance, wherein the first forwarding entry and the second forwarding entry are isolated from each other.

18. The computer-readable storage medium according to claim 17, wherein the path information comprises an IP address of a first device.

19. The computer-readable storage medium according to claim 17, wherein the path information comprises an identifier of a port used by a first device to receive the packet and an identifier of a port determined by the first device and used to forward the packet.

20. The computer-readable storage medium according to claim 17, wherein the path information comprises information used to indicate that the path is interrupted.

* * * * *